(12) United States Patent
Zaidi et al.

(10) Patent No.: US 12,315,272 B2
(45) Date of Patent: *May 27, 2025

(54) MULTI-TIERED TRANSPORTATION IDENTIFICATION SYSTEM

(71) Applicant: Birdseye Security Inc., Mississauga (CA)

(72) Inventors: Ahmed Zaidi, Mississauga (CA); Vladimir Jankov, ěka (RS); Kai Yue Peter Yap, Pitt Meadows (CA); Luka Bajic, Belgrade (RS); Ho Yin Fung, North York (CA)

(73) Assignee: Birdseye Security, Inc., Mississauga (CA)

( * ) Notice: Subject to any disclaimer, the term of this patent is extended or adjusted under 35 U.S.C. 154(b) by 337 days.

This patent is subject to a terminal disclaimer.

(21) Appl. No.: 17/866,943

(22) Filed: Jul. 18, 2022

(65) Prior Publication Data

US 2024/0020623 A1    Jan. 18, 2024

(51) Int. Cl.
| | |
|---|---|
| *G06V 20/64* | (2022.01) |
| *B64U 10/13* | (2023.01) |
| *G05D 1/00* | (2006.01) |
| *G06Q 10/0833* | (2023.01) |
| *G06V 20/17* | (2022.01) |

(Continued)

(52) U.S. Cl.
CPC ............ *G06V 20/64* (2022.01); *B64U 10/13* (2023.01); *G05D 1/0088* (2013.01); *G05D 1/0094* (2013.01); *G05D 1/101* (2013.01); *G06Q 10/0833* (2013.01); *G06V 20/17* (2022.01); *G06V 20/54* (2022.01); *G06V 20/62* (2022.01); *G06V 30/14* (2022.01); *B64U 2101/31* (2023.01); *B64U 2201/10* (2023.01)

(58) Field of Classification Search
CPC ........ G06V 20/64; G06V 20/17; G06V 20/54; G06V 20/62; G06V 30/14; B64C 39/024; G05D 1/0088; G05D 1/0094; G05D 1/101; G06Q 10/0833; B64U 2101/30; B64U 2201/10; B64U 2101/31
USPC ....................................................... 382/103
See application file for complete search history.

(56) References Cited

U.S. PATENT DOCUMENTS

| | | | |
|---|---|---|---|
| 6,026,177 A * | 2/2000 | Mong | G06V 30/244 382/156 |
| 9,330,339 B2 | 5/2016 | Hofman | |

(Continued)

FOREIGN PATENT DOCUMENTS

| | | | | |
|---|---|---|---|---|
| CN | 112349150 | * | 5/2022 | ............... G06N 3/08 |
| GB | 2552092 | | 1/2018 | |

(Continued)

*Primary Examiner* — Jerome Grant, II
(74) *Attorney, Agent, or Firm* — Fish IP Law, LLP; Tomas A. Prieto

(57) ABSTRACT

A system for identifying an aspect of interest on a vehicle that includes a local AI system that can analyze sensor data from an on-site sensor to make an attempt to identify the aspect of interest according to first criterion. The aspect of interest can be information printed on the vehicle and/or on a seal of the vehicle. If the local AI system is unable to identify and validate the information on the first effort, it can consult with a central/global AI system that can leverage its own database and other local systems at other locations for subsequent attempts at identifying and validating the aspects of interest.

9 Claims, 9 Drawing Sheets

(51) Int. Cl.
    *G06V 20/54*     (2022.01)
    *G06V 20/62*     (2022.01)
    *G06V 30/14*     (2022.01)
    *B64U 101/31*     (2023.01)

(56) References Cited

U.S. PATENT DOCUMENTS

| | | |
|---|---|---|
| 9,505,494 B1 | 11/2016 | Marlow et al. |
| 11,562,583 B1* | 1/2023 | Zaidi ............... G06V 20/62 |
| 2014/0294147 A1* | 10/2014 | Chen ............... G01V 5/232 |
| | | 378/57 |
| 2021/0196398 A1* | 7/2021 | Ye ............... A61B 1/307 |
| 2023/0401665 A1* | 12/2023 | Warkentin ............ G06V 10/82 |

FOREIGN PATENT DOCUMENTS

| | | |
|---|---|---|
| JP | 2022514859 A | 2/2022 |
| KR | 20190126607 | 11/2019 |

\* cited by examiner

MULTI-TIERED TRANSPORTATION IDENTIFICATION SYSTEM

FIELD OF THE INVENTION

The field of the invention is information identification and verification for transportation.

BACKGROUND

The background description includes information that may be useful in understanding the present invention. It is not an admission that any of the information provided herein is prior art or relevant to the presently claimed invention, or that any publication specifically or implicitly referenced is prior art.

A critical part of transporting containers is ensuring their integrity from the point of origin to their destination. For example, a truck trailer or container that was loaded and shut in Tampa, Florida must remain unopened along the route until it arrives at its unloading destination in Toronto, Canada. To do so, seals are attached to the doors of a container once the container is shut. The integrity of this seal is then checked at the point of destination for tampering, and the seal is also checked against an identifier of a truck to make sure that the entire transport system (tractor plus trailer/container) is consistent with the information at departure.

Unfortunately, reviewing identifying information such as trailer numbers, seals and seal numbers at the point of arrival is time-consuming. This leads to back-ups of trucks at a receiving site, which results in wastes of time and fuel as trucks wait to be admitted and verified. Additionally, in certain areas having a line of trucks outside of a facility can be dangerous as some of these receiving stations are located in dangerous areas.

The location of the seals and the identifiers for a truck and/or container is not industry standard. It can vary from company to company, from manufacturer to manufacturer, and even from journey to journey. Numbers printed on a tractor or a trailer can be vertically arranged, can be of different sizes and colors, of different fonts, etc. Seals are not universal either. All of this presents a challenge in automation because this information must first be found before it can be used to identify and validate the truck and the integrity of the shipment.

Moreover, it is important to be able to track the progress of a truck and container as it makes its journey from origin to destination, as it might stop at stations along the way to change drivers, or truck tractors.

Thus, there is still a need for a system that can rapidly and accurately locate and verify necessary information on a truck while accounting for these variables, and that can leverage knowledge gathered across a network of locations.

SUMMARY OF THE INVENTION

The inventive subject matter provides apparatus, systems and methods in which an artificial intelligence ("AI") system can identify an aspect of interest of a target. A local AI system uses a first sensor to derive a first set of sensor data from an environment that contains the target. Then, the local AI system analyzes the sensor data to make a first attempt at identifying the aspect of the target. The system then determines whether the results of this first attempt satisfy a criterion (e.g., a level of confidence, an accuracy, etc.). If the results of the first effort fail to satisfy the criterion, then at least some of the first set of sensor data is provided to a global AI system to make a second effort at identifying the aspect of the target.

In embodiments, the target is a tag or seal on a truck and the aspect of the target is code (e.g., alphanumeric code or other sequence of digits) printed on the tag.

In embodiments, the global AI system is programmed to utilize a second sensor to obtain second sensor data if the second effort fails to meet a corresponding second criterion, and the global AI system makes a third effort to identify the aspect of the target with this second sensor data (and optionally, some of the first set of sensor data).

In these embodiments, the global AI system is programmed to instruct the second sensor to change positions and/or vantage points by directing a movement of the second sensor via an actuator system of the second sensor.

In these embodiments, the first and/or second sensors can be camera systems that have actuators that allow the camera to pivot vertically and pan horizontally, as well as zoom capabilities.

In a variation of these embodiments one or both of the second sensor can be cameras mounted on drones. In these embodiments, the actuator system can collectively refer to flight controls of the drone as well control over features of the camera itself (e.g., zoom, focus, etc.).

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms, is deemed to represent one or more computing devices having at least one processor (e.g., ASIC, FPGA, DSP, x86, ARM, ColdFire, GPU, multi-core processors, etc.) programmed to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
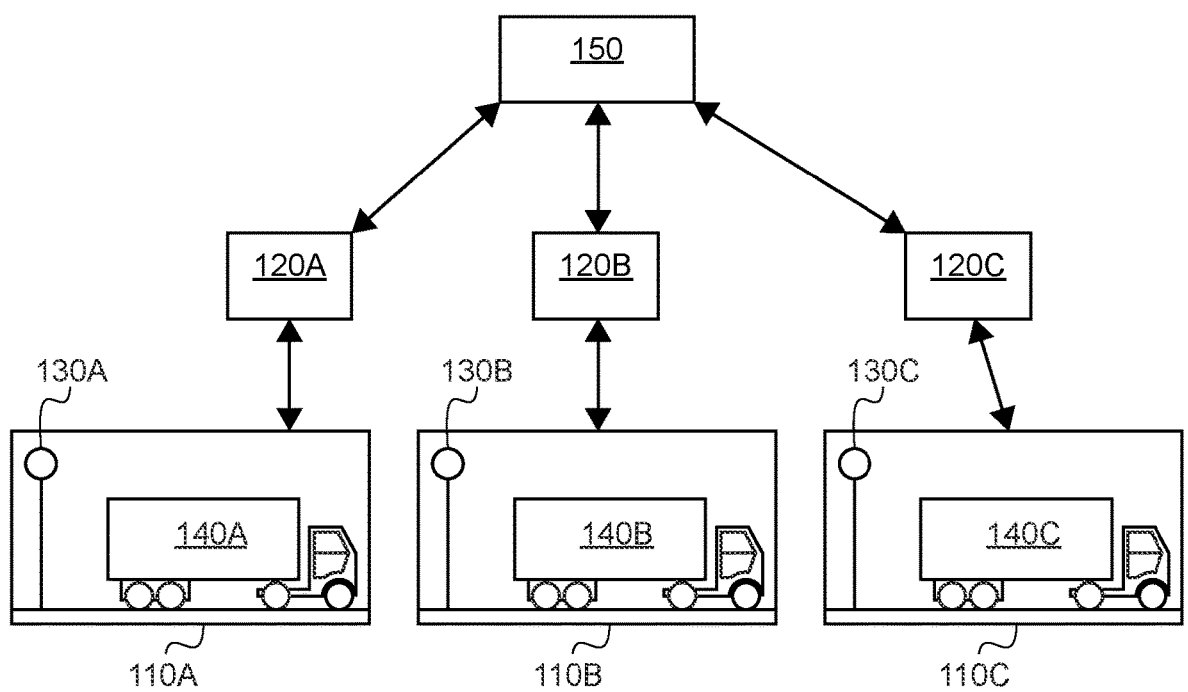
FIG. 1 is a diagrammatic overview of the components of a system according to embodiments of the inventive subject matter.

FIG. 1 shows an overview of the components of a system 100 according to embodiments of the inventive subject matter.

FIG. 1 shows a plurality of locations 110A-110C. Each of these locations 110 could be a point of origin for vehicle 140 such as a truck or other vehicle that can be closed to carry cargo or carry a shipping container, a destination point, or an intermediate point along a journey from a point of origin to a destination. Here, only three locations 110 are shown, but it is understood that many other locations could be a part of the system 100.

At each location, there is a local artificial intelligence ("AI") system 120 that is communicatively coupled with one or more sensors 130 at the respective location 110, and also communicatively connected with a global AI system 150 that is coupled to other local AIs 120 at other locations 110.

One or more of the local AI systems 120 can include or be in communication with a respective local database driven system (DDS) that can store information locally. The DDS can include one or more computer systems that include processors and physical memory that can house the databases contained therein. The global AI system 150 can also include or in communication with its own DDS that houses information relevant to network-wide functions, including assisting local AI systems 120 with queries. In embodiments, the database managed or belonging to the global AI system 150 is significantly larger than the local databases of the local AI systems 120. For example, the database of a given local AI system 120 could be limited (either artificially, or by actual available resources) to a particular period of time's worth of accumulated data (e.g., 20 days, 30 days, 60 days, etc.) and/or could be limited to storing only locally-relevant information (e.g., only information about trucks/companies that have actually passed through the particular location 110). In contrast, the database of global AI system 150 is considered to be a global repository of information for future use that can include information about companies, different trucks, trailers, seals, and any other relevant information that can assist in the future identification of a truck at a location 110.

Local AI 120 can be a computer system or groups of computer systems that are local to the location 110. The local AI 120 can include cloud components for storage (such as parts of the DDS), however it is to be understood that at least a portion of the local AI 120 is physically located on site at the location 110.

The global AI system 150 is considered to be a computer system or groups of computer systems remotely located from the locations 110. In embodiments, the global AI system 150 could be local to one of the locations 110 but would still be a central hub for all of the local AI 120 of the network of locations 110. The global AI system 150 can be located partially or entirely on the cloud.

The local AI system 120 and global AI system 150 are each considered to have underlying physical computer system(s) that have at least one processor, memory, communications interfaces for data exchange, user interfaces for data input and output (e.g., via keyboards, mice, touch screen, voice input, screens for video and image output, etc).

Typically, the sensor 130 at the location 110 is a camera capable of capturing still images, video and sound, but other sensors can be used as well.

When a truck 140 arrives at a location 110, the sensor 130 captures sensor data that is then provided to local AI 120.

For example, the truck 140 is instructed to park at or pass through an area that is within the view of a camera 130.

At the location 110, the environment can have fiducial markers that are within the default view of the camera 130, to be used for calibration of the system and can be used for reference in inclement weather or visibility situations. In embodiments, the fiducial markers can be brightly colored landmarks, such as yellow posts that are erected in the visible environment at the camera's default view (i.e., default pan, tilt, zoom and other settings). A reference image is taken during a clear, good weather condition. This image can be used as a reference for comparison in situations of inclement weather where visibility is limited by comparing the reference image to the real-time reduced visibility images and finding the location of the fiducial markers in each. This way, the system can properly calibrate the camera and maintain spatial awareness in the reduced-visibility situations.

Figure 2:
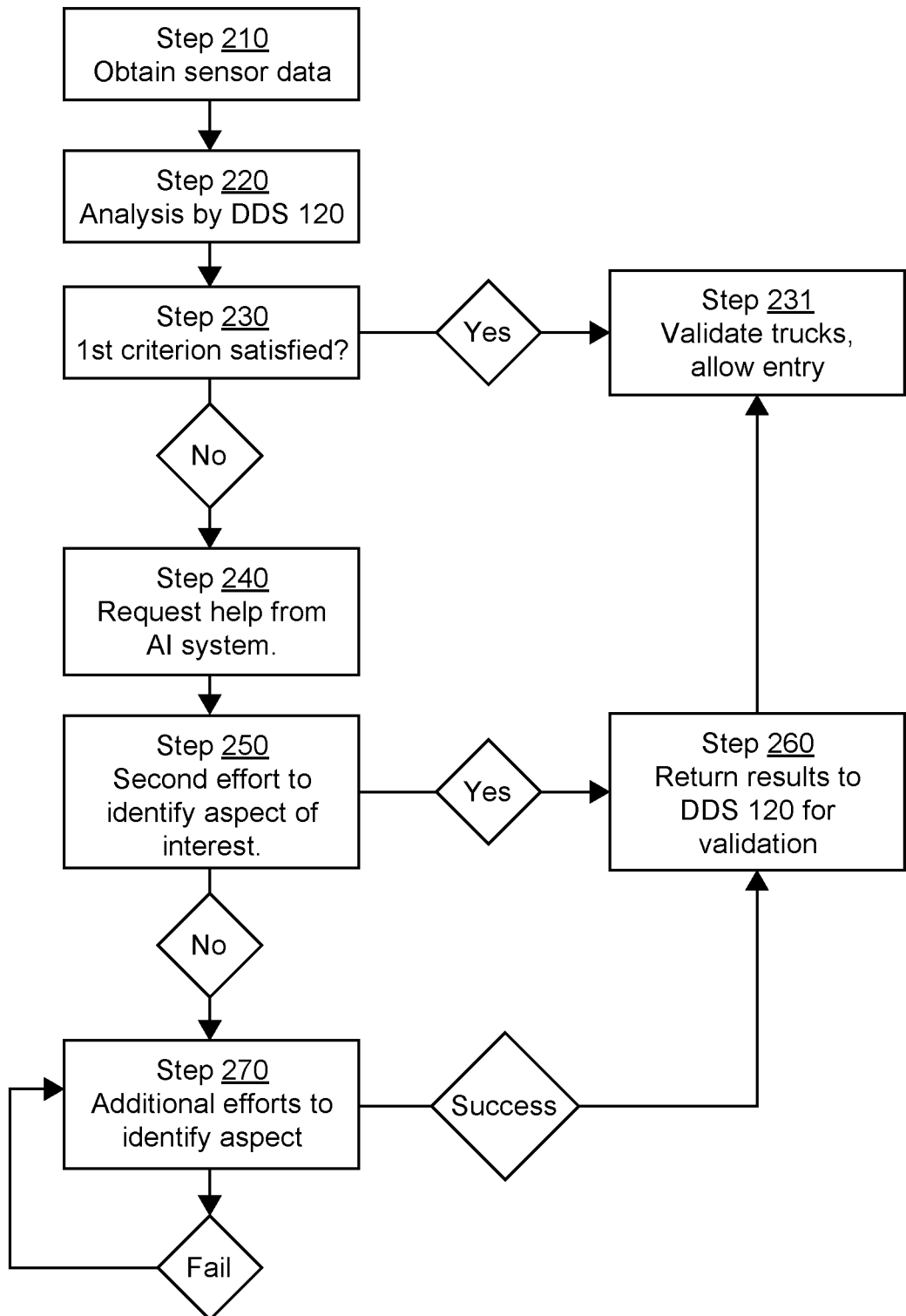
FIG. 2 is a flowchart of processes according to the inventive subject matter.

FIG. 2 shows a flowchart of the processes according to embodiments of the inventive subject matter. While the description refers to the processes occurring at location 110A, it is understood that these processes could be carried out at any of the locations 110 of the network for trucks 140 arriving there via their respective local AI 120.

At step 210, a sensor 130A (in this example, a camera), begins obtaining sensor data in the form of image data (which can be still or video, and with or without sound) that includes a vehicle 140A (in this case, a truck 140A having a trailer).

At step 220, the local AI system 120A that is local to the sensor 130A begins to analyze the obtained sensor data as a first effort to identify an aspect of interest of the truck 140A.

The aspect of interest can generally be one or more items of information that are to be gathered from the truck 140A. Examples of aspects of interest can include a tractor number, a trailer number, registration numbers, a seal presence, a seal number etc. In this example, the aspects of interest sought are a trailer number and a seal number.

In embodiments, the target generally can include a tag or seal attached to a truck 140A. In these embodiments, the aspect of interest would be information printed on the seal/tag. The information can be alphanumeric digits, a machine-readable code (e.g., QR code, barcode, etc.), or other information.

Thus, at step 220, the local AI 120A analyzes the image data from the camera 130A to try and find the aspects of interest on truck 140A.

To try and find the information of interest, such as on a truck 140A, the local AI 120A can analyze the image data and then control the sensor 130A such that it can look for the information and zoom in on potential areas of interest. In these embodiments, the sensor 130A (e.g., a camera) can have pan-tilt-zoom ("PTZ") capabilities that can be controlled by the local AI 120A in order to try to obtain and identify the aspect(s) of the target of interest.

Figure 3A:
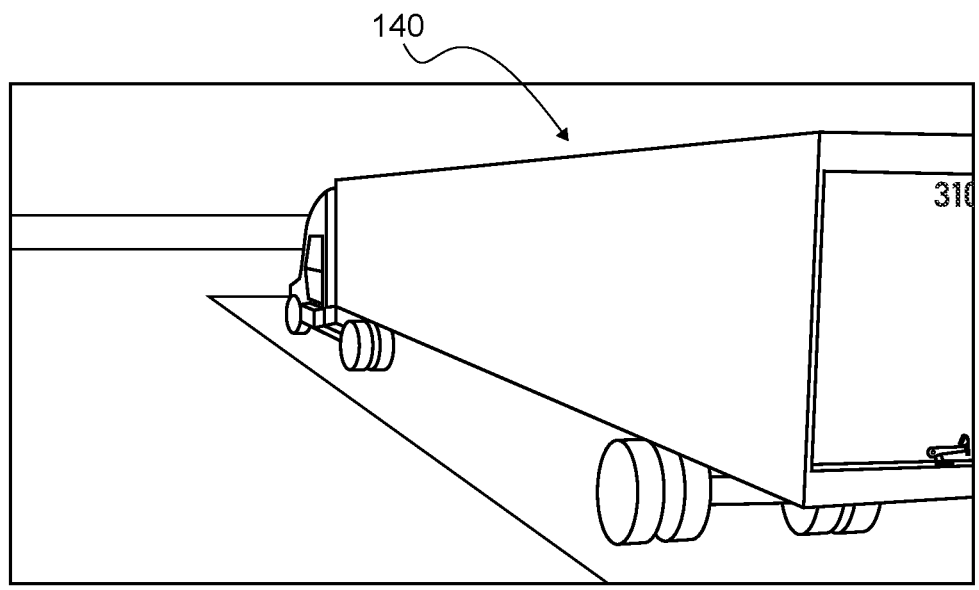
FIGS. 3A-3E are perspective views from the camera as it searches for an aspect of interest on a trailer.

FIG. 3A shows a default view by a camera 130A. This image data shows most of a truck 140A, and the local AI 120A in this situation must find a trailer number and a seal in order to be able to verify the truck 140A. However, in its default view, the camera 130A is set for a truck pulling a normal-sized trailer. Because this is a long trailer, part of the trailer is outside of the view of this image data. In the view of FIG. 3A, a seal (and thus a seal number) is not visible. Likewise, only the first couple of digits of the trailer number 141 (the numbers "31") are visible.

Figure 4A:
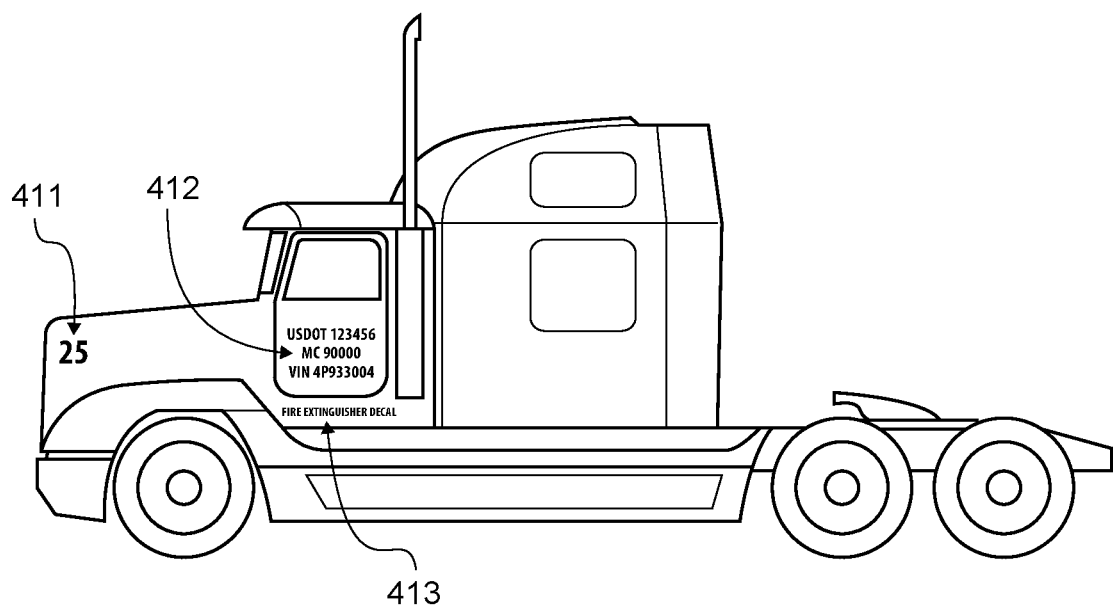
FIGS. 4A-4B are examples of a tractor and a trailer, showing possible locations of information relevant to the systems and methods of the inventive subject matter.
Figure 4B:
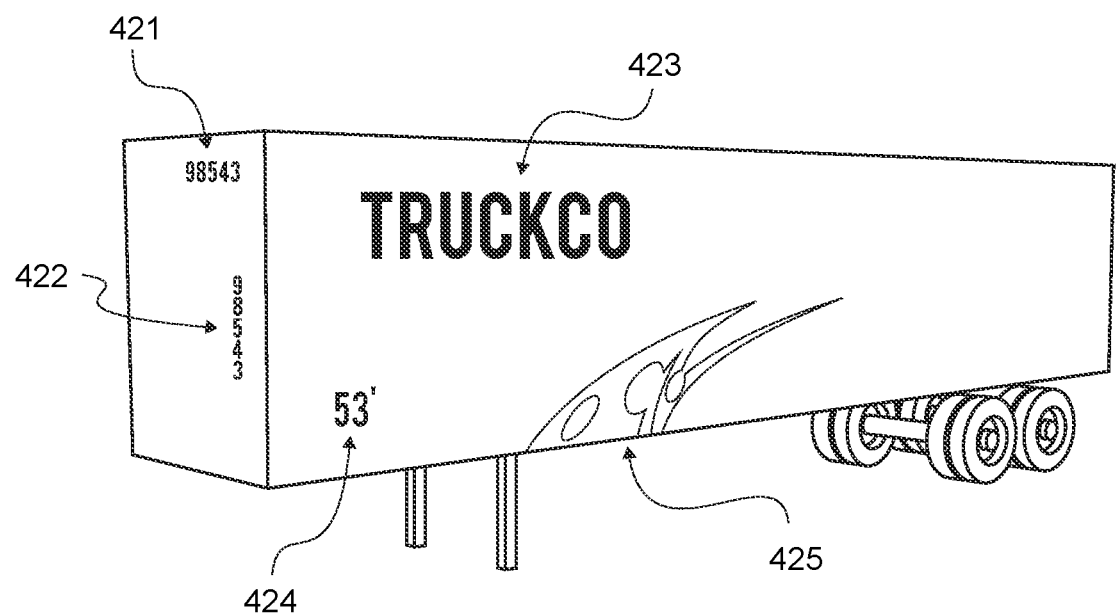

One challenge to obtaining these aspects of interest is that while there are governmental labeling requirements for commercial vehicles, there exists the potential for great variation in how these labels are displayed. Additionally, in certain situations, the sensor 130A is obtaining the sensor data while the truck 140A is moving. FIGS. 4A-4B provide an illustrative example of a tractor 410 and trailer 420 that show some of the items of information and their possible locations.

As seen in FIG. 4A, the tractor 410 can include information such as a truck number 411, regulation number 412 (which can include USDOT numbers, VIN numbers, etc.) and a fire extinguisher decal 413. However, the commercial labeling requirements only specify that a label must be on both sides of a vehicle, must be a contrasting or bold color, and must be a minimum of 2 inches tall. There is no standard font, size, color, background color, etc. for these labels. For example, the truck number 411 must generally be on the hood and to the side of the truck, but there's no standard placement for it that can be relied upon consistently.

Likewise, the trailer 420 of FIG. 4B can include a horizontal trailer number 421, a vertical trailer number 422, trailer lettering 423, and an overall length label 424, and graphics 425 but there is significant variance on where some of these items of information may be. Some, such as the graphics 425, may not even be required. And for those that must be there—like the trailer number 422, there's no regulation as to whether the number must be, nor its font or color, nor whether it must be written vertically or horizontally.

Figure 5:
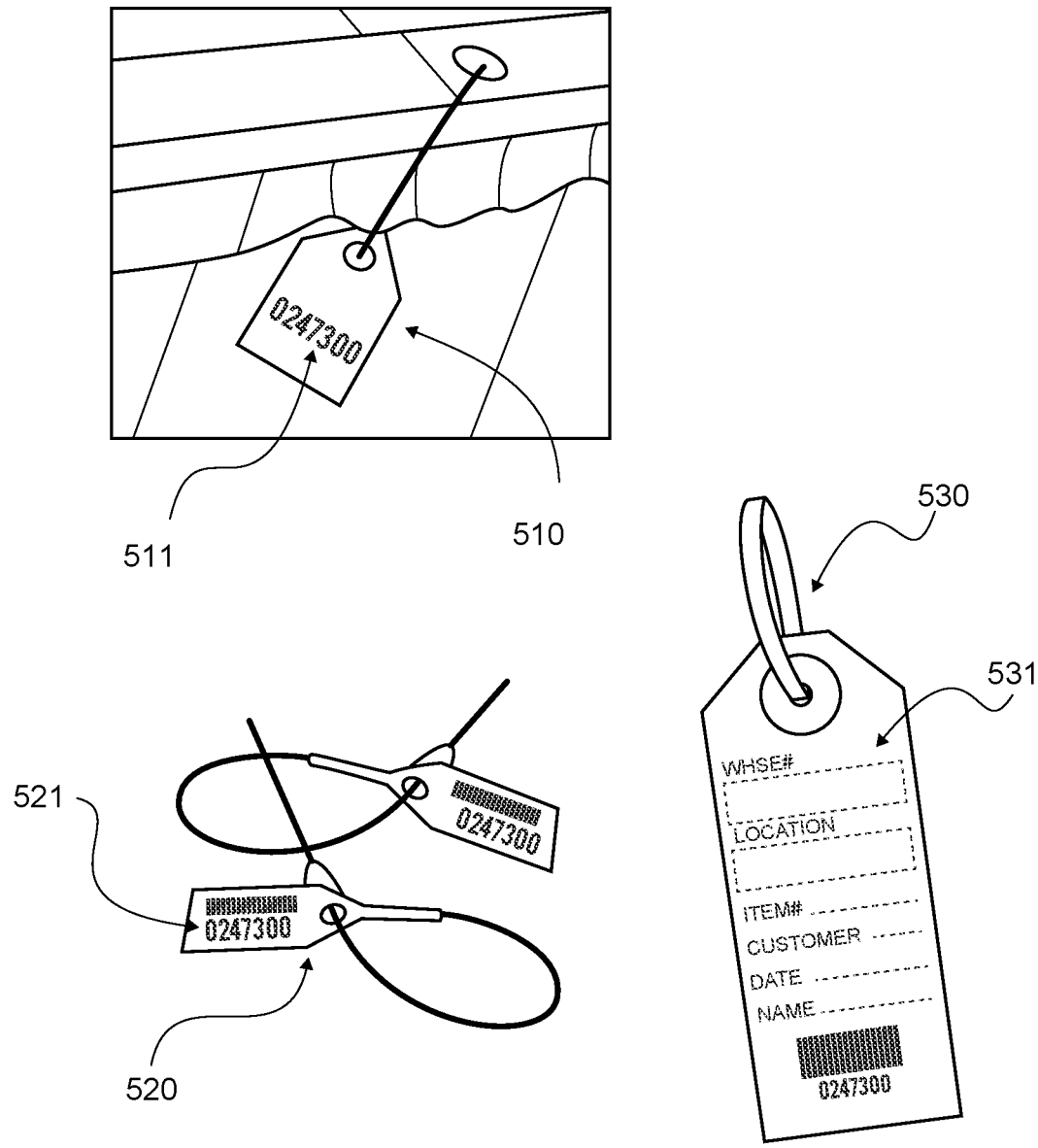
FIG. 5 shows examples of different types of seals and the materials that can be printed on the seals.

Additionally, there are a near infinite number of ways that seal numbers can be displayed because there is no standardization for the seals or the seal numbers. FIG. 5 shows three types of common seals 510, 520 and 530 that have information 511, 521, 531 printed on them, respectively. These are only three example among many possible seals that could be used in the industry, and serves to illustrate just how different these seals (and the way the information is imprinted on them) can be. It should be noted that in addition to or instead of the printed information, a seal could have embedded WiFi, RFID or other communication capability that would allow it to exchange data wirelessly. Using the techniques discussed herein, the system can learn to identify seals that contain these capabilities and, upon detecting them at a location 110, the local AI 120 can communicate this to relevant system to establish a communication with the seal.

At step 230, the local AI 120A determines whether the first attempt of step 220 satisfies a first criterion (or first collection of criteria). The first criterion can be a reliability criterion or an accuracy criterion. A reliability criterion (otherwise known as a confidence criterion) is a confidence that a particular identified feature or information has been properly located or identified. For example, if it is known that a truck has a particular color and that it is from a particular company, then from historical information (encounters of similar trucks with this company) it is likely to a certain determined percentage that the tractor number is in the front, will be of black text and will have particular prefix as part of its identification number. An accuracy criterion is a measure of how accurately a feature has been identified. This can be based on a comparison of the identified feature against a reference number in a database, for example.

In embodiments, the first criterion/criteria can be (or additionally include) a visibility criterion based on whether or not the target object is partially obscured in the image data.

This step can be repeated as the local AI 120A can make corrections by issuing commands to the PTZ actuators of the camera 130A. Thus, after analyzing the image of FIG. 3A, the local AI 120A does not find any aspects of interest (e.g., a seal and seal number, a trailer number) such that the first criterion is satisfied. However, before handing off the process to the AI system 150, the local AI 120A can control the camera 130A to move to get a better view. In this case, the local AI 120A has a priori been programmed to understand that if a trailer's rear is partially or fully off camera, then it is most likely to the right of the camera view because of the physical position of the camera 130A relative to the space for receiving a truck 140A.

In embodiments, the a priori programming can be programmed at system install, where the system can be calibrated and programmed to account for known conditions such as the relative position of the camera 130A relative to the driveway where the trucks are likely to pass, the height of the camera, ambient lighting during the day and/or night, etc.

In embodiments, the a priori programming can be obtained by the local AI 120A learning about the environment via trial and error. For example, over time the local AI 120A can attempt to pan, tilt and zoom in different forms until it achieves success. As these attempts aggregate, the local AI 120A learns via machine learning techniques where the information it is looking for is most likely to be relative to the default frame, and it can start by panning/tilting in that direction. At first, the system will likely have to move the camera in various ways until it acquires enough attempts to make a meaningful prediction on the likely camera adjustments required.

Figure 3B:
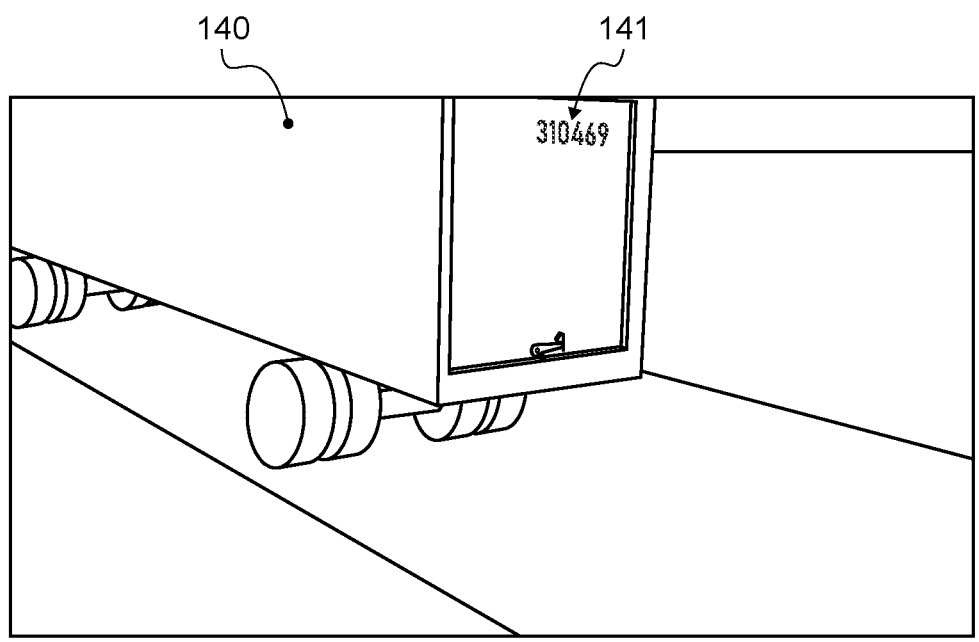

Thus, the local AI 120A issues a command to the camera 130A to pan to the right. It does so, and results in the view of FIG. 3B. In FIG. 3B, the trailer number 141 is clearly visible and is recognized by the local AI 120A (via image recognition techniques) to a sufficient level such that the first criterion is satisfied.

However, the first criterion regarding information on a seal is not sufficiently visible at this step. Applying image recognition techniques, the local AI 120A is able to recognize the door latch 142 of the trailer. From past attempts on many other trucks, the local AI 120A has learned (via machine learning techniques) that tags and seals are most likely attached to the door latch of a trailer. Correspondingly, the local AI 120A commands the actuators of camera 130A to tilt downward to center the field of view over the trailer door latch 142, as seen in FIG. 3C.

Figure 3C:
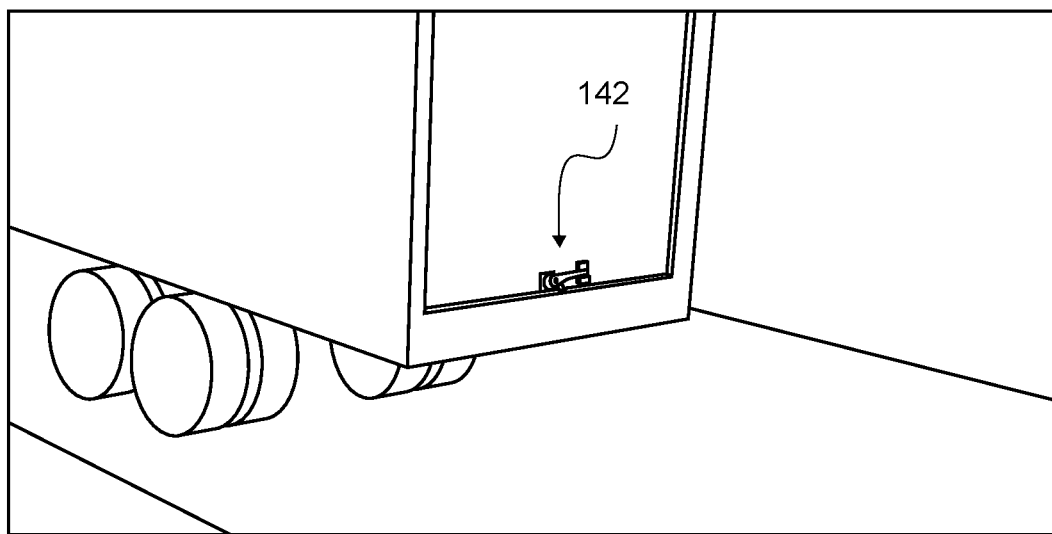
Figure 3D:
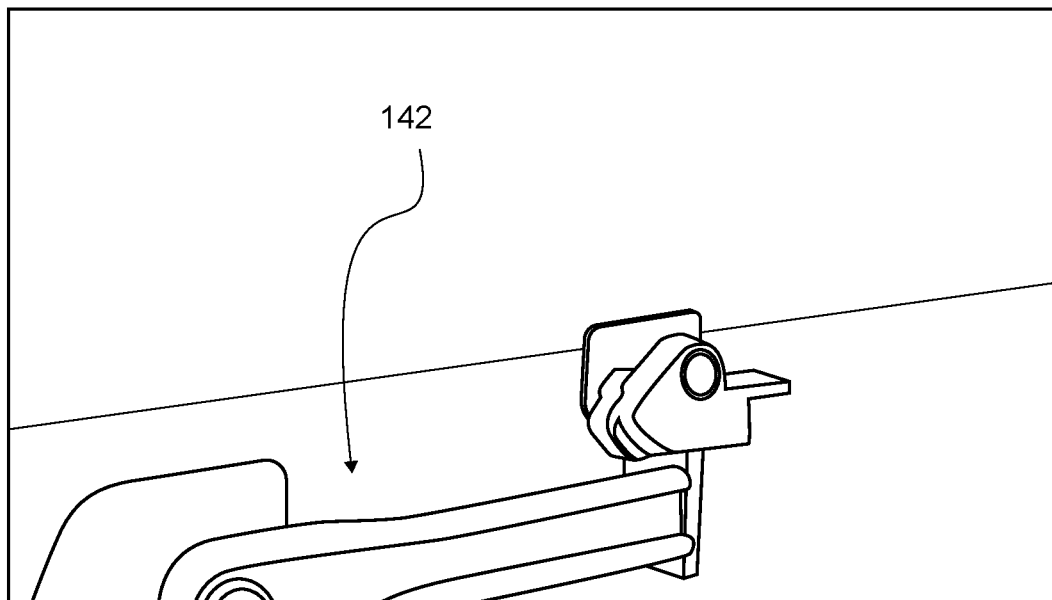
Figure 3E:
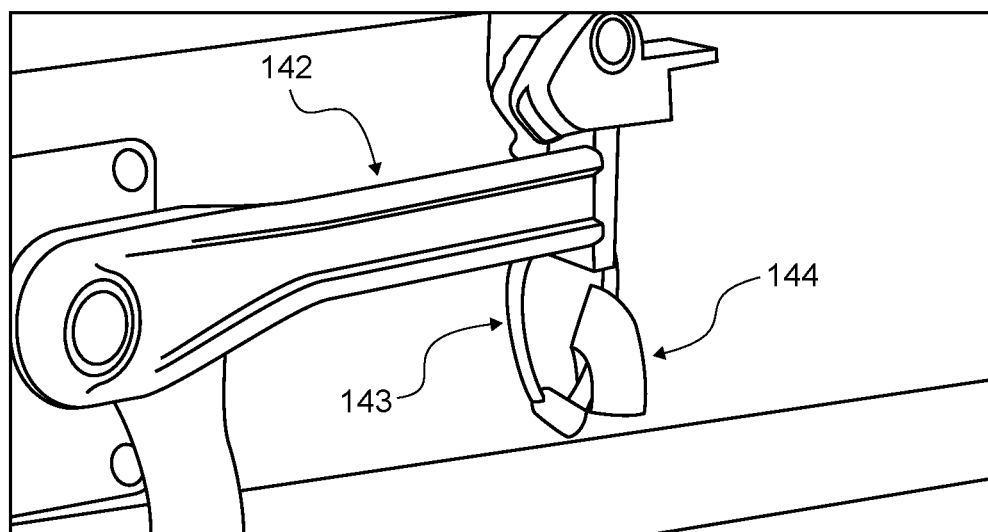

However, the view of FIG. 3C is still too far for the local AI 120A to be able to find and identify a seal. Thus, the local AI 120A commands the camera 130A to zoom in, which is shown in FIG. 3D. However, the seal is not visible in FIG. 3D. Because the local AI 120A "knows" (from prior analysis of other trucks that have come through in the past or from prior consultation with the global AI 150) the seal is typically attached to the latch 142 of the trailer. By applying image recognition techniques, the local AI 120A determines that the latch 142 is partially, but not completely, within the image. Therefore, the local AI 120A commands the camera 130A to tilt further down and then zoom into the area of the latch 142, as shown in FIG. 3E. In FIG. 3E, the seal 143 attached to latch 142 is visible as well as a tag 144.

In embodiments, the local AI 120 has some a priori knowledge of one or more of the truck, the trucking company, and the seal used by the trucking company, that it can apply in the search for the aspects of interest. For example, if the local AI 120 already has data that indicates that the seals used by a particular trucking company are yellow, the local AI 120 the puts greater weight on parts of the image that are yellow or close to yellow in the RGB spectrum as places to search.

In this example, if the seal 143 itself is the aspect of interest, then merely being able to find it and be able to confirm that the seal is in place to a sufficient degree of confidence (e.g., a probability based on image recognition that the seal is in place) satisfies the criterion. In this case, the tag 144 is not of interest and the local AI 120 disregards it.

Thus, if the first criterion is satisfied after the first effort, the local AI 120A approves the truck 140A based on the trailer number 141 and seal 143 and the truck is allowed to enter the facility at step 231. The results of the search (e.g., the identifying information such as the trailer number, visual characteristics of the seal, location of the seal and other identifying information on the trailer and truck, etc.) can be provided to the global AI system 150 so that this information can be used with or provided to local AI 120s of other locations 110 for identification of similar trucks or for this company at these locations.

If this is the first time that the local AI 120A has successfully found the seal 143 for this trucking company, the local AI 120A can record this information. For example, if the type of seal was previously know for this trucking company but not the color, the local AI 120A can store that this trucking company uses a seal of this color (e.g., yellow). This information can also be provided to the global AI system 150 for long-term storage and/or to share with other locations.

If, in the example of FIGS. 3A-3E, the aspect of interest is information printed on the seal 143 and not just the seal 143 itself, then the first criterion would not be satisfied on this first effort because there is no information visible on the seal 143 in the image of FIG. 3E, and there are no additional views that would be useful.

If the first criteria is not met, the local AI 120A is programmed to contact the global AI system 150 for assistance. At step 240, the local AI 120A provides at least some of the sensor data (in this example, image data from one or more of the images of FIGS. 3A-3E) from sensor 130A to the AI system 150. The local AI 120A can also provide additional information that it has gathered. Thus, if it successfully determined the trailer number 141, the local AI 120A could also provide this information to the AI system 150.

The first attempt by the local AI 120A could fail to meet the first criterion for several reasons. For example, if the local AI 120A has not analyzed a truck from a particular company before, it would not have prior knowledge of things like the type of seal that particular company uses. In another situation, some of the aspect of interest could be obscured by mud, dirt, or snow. In yet another situation, the weather at the location 110A could limit visibility such that the image data from the camera 130A is not of a sufficient quality for the local AI 120A to clear the criteria thresholds for the first criterion.

In embodiments, the local AI 120A can be programmed to spend a certain amount of time on the attempt and/or be limited to a certain amount of adjustments to the camera 130A before determining the first attempt has failed. This way, the local AI 120A can escalate the situation to the AI system 150 without unduly delaying the truck 140A, other trucks that might be in line, and the station 110A. The time limit and/or attempt limit does not require the local AI 120A to go through the process all the way to FIG. 3E. It may be that the local AI 120A makes a very quick initial scan of the image data at the default setting or only make one or two adjustments to the camera view before proceeding to the AI system 150.

At step 250, the global AI system 150 then proceeds to make a second effort to identify the aspects of interest of the target 140A. The second effort can be performed according to the first criterion as well. However, in preferred embodiments, the second effort is performed according to a second criterion (or second collection of criteria).

The second criterion can be a reliability criterion or an accuracy criterion. In embodiments the second criterion can be of the same type but of a different value than the first criterion. For example, the second criterion can be a different reliability threshold than the first criterion. In other embodiments, the second criterion can be of a different type than the first criterion. For example, if the first criterion is a threshold of accuracy, then the second criterion could be a threshold of reliability.

In embodiments, the global AI system 150 can recognize at least one of the aspects of interest to get a preliminary result. This preliminary result can be one of the aspects of interest that was sought by the local AI 120A or a different set of information. For example, if the local AI 120A searched for a trailer number and a seal, the global AI system 150 can first look for the trailer number. Alternatively, or additionally, the global AI system 150 can be programmed to look for a license plate number, a company name, or other identifying information for the truck and/or the trailer that is included in the image data provided by the local AI 120A. The AI system 150 can then query another of the local AI 120 (e.g., local AI 120B and 120C and other local AI 120s) in the network, which can include local AI 120 at locations 110 along the route traveled by truck 140A to see if any of the other local AI 120 have image data of a higher quality (e.g., focus, higher resolution, closer distance, etc.) than the image data capture by camera 130A.

In this example, the higher-quality image data can be analyzed by the global AI system 150 using image recognition techniques to obtain the remaining aspects of interest. For example, using this higher quality imagery, the AI system 150 could determine that the truck 140A did have a seal attached during the journey. Based on positively identifying a seal, the AI system 150 can return information to the local AI 120A that tells the local AI 120A where on the trailer to search for the seal.

The local AI 120A can provide information that it determined that does not meet the first criterion. For example, if the local AI 120A derived a number from the image data that corresponds to the trailer number 141, but could not find a match for this trailer number, the local AI 120A can still provide the derived trailer number 141 to the AI system 150. This can help the system determine a correct location of a trailer number in situations where a different identification number (such as department of transportation ID number) is mis-read as a trailer number.

In this example, the second effort by the AI system 150 can include a review of the number against known trailer number formats and/or actual trailer numbers. This can be performed against a database stored by the AI system 150. Alternatively and/or additionally, the global AI system 150 can query other local AI 120 at other locations to determine whether there is a match in format or actual trailer number. These other local AI 120 then report their findings back to the AI system 150. This review can also be performed by the global AI system 150 and/or other local AI 120 for other numbers that could match the provided number, either via an approximate or exact match of alphanumeric characters or in format (by length, prefixes, etc.). Thus, if this review returns a result of a different type of identification number (e.g., DOT number, or other identifier), the AI system 150 can instruct the local AI 120A to look elsewhere for the trailer number.

If the other local AI 120 at other locations have the information requested by the AI system 150 (e.g., photographs of the truck along the route, a match of a trailer number, etc.), they provide it along with other relevant information back to the AI system 150. The relevant information can be information that is associated with the requested information, that could be linked or otherwise associated at one or more of the local databases of the local AI 120 at other locations. For example, if the AI system 150 requested a search for a trailer ID number or trailer number formats to try to identify the company associated with the trailer, a local AI 120 could provide the appropriate number match or trailer number format (if found), as well as a company name and/or a probable location of a seal for trailers of this company.

Thus, the preliminary result could be a confirmation of some of, but not all of the aspects of interest sought by the local AI 120A.

In embodiments, if the second effort by the AI system 150 succeeds, the AI system 150 sends information to the local AI 120A to assist the local AI 120A in a future identification of the aspect of the target. This can include associations between a trucking company and the locations where an identifier and/or a seal is most likely to be, additional serial numbers associated with one or more companies, or other information.

In some embodiments, the second effort can be determining a search area of a truck or trailer that satisfies a second criterion for confidence of a search in this area. For example, a result of consulting the AI system 150's database and/or consulting with other local AI 120 of other locations 110 can return a result that the aspect of interest sought (e.g., the seal containing the seal information) is likely to be found at a particular area of the trailer 140. This information can be relayed to the local AI 120A with commands for camera 130 to expand the search. If the local AI 120A is unable to locate the seal and information such that the criterion for the seal and its information is met, then the local AI 120A can re-consult with the AI system 150 and the process can repeat using one or more of the approaches discussed herein. In a variation of these embodiments, the AI system 150 can be provided control of the camera 130 directly, such that the AI system 150 can obtain additional image data based on the results of its analysis and/or the information it receives in response from other local AI 120. In these embodiments, the AI system 150 can then instruct the camera 130A, via the camera's PTZ actuators, to capture additional areas of the truck such that a better determination can be made.

In embodiments, information associated with the first attempt that meets some of the criteria of the first attempt is provided by the local AI 120A to the AI system 150. For example, if the local AI 120A successfully detected the trailer number but still needs to determine that the seal is present (and determine the seal number), the local AI 120A can provide the obtained trailer number. In response to this, the AI system 150 can search its own database and/or consult with other local AI 120 for the missing information.

In these examples, the AI system 150 and/or the other local AI 120 at other locations 110 can perform the requisite analysis by conducting image recognition on previously-captured images of trucks at those locations, and statistically compiling the results. From this, the systems can create associations based on the statistical commonalities of trucks. For example, from this, the systems can store associations between tractor colors and trucking companies, trailer colors and companies, companies and common locations of the different types of identifying information, companies and the typical types of seals used, the companies and/or trailer types and the typical seal locations, and other associations. This can be performed over time and a database constructed that then stores the data and the respective associations, such that when a query from local AI 120A is provided to the global AI system 150, the AI system 150 and/or the other local AI 120 can rapidly conduct an analysis and provide a response.

If the second effort by the AI system 150 succeeds, the AI system 150 sends, at step 260, the results of the second effort to the local AI 120A that can include a confirmation that the aspects of interest initially sought by the local AI 120A. If there is no additional aspects of interest to find and detect, the local AI 120A verifies the trailer and its integrity (because of the located seal) and allows the truck 140 to enter the facility 110A at step 231.

If the second effort by the AI system 150 fails, the AI system 150 can, at step 270 send an instruction to a second sensor 131 at the location 110A that causes the second sensor 131 to provide sensor data regarding the target 140A. The second sensor 131 can be the same type of sensor as sensor 130A (e.g., a second camera) or a different type of sensor than sensor 130A (e.g., if sensor 130A is a camera attached to a physical structure, sensor 131 can be a microphone, or a camera with thermal or infrared vision, or a temperature monitor, or a camera on a drone, etc.). Then, using the second sensor data, the AI system 150 can make a third attempt to identify an aspect of the target based on the second sensor data. The third attempt can include analyzing the second sensor data in a similar manner to the first sensor data, which can include consulting with other local AI 120 for additional information or analysis as discussed herein.

In embodiments, the instructions sent from the AI system 150 to the second sensor 131 are instructions that direct the movement of an actuator system that then moves or otherwise changes the position and/or orientation of the second sensor 131.

In a variation of these embodiments, the actuator system can be a flying drone. In these embodiments, the second sensor can be a camera attached to the flying drone. In these embodiments, the instructions sent from the AI system 150 can be flight instructions to command the drone to fly to certain locations relative to a truck 140 to enable a search for the aspects of interest.

If the third effort at step 270 is successful, the global AI system 150 can report the successful information to the local AI 120A for subsequent processing (if additional aspects of interest remain) and/or validation as with successes after step 230 or step 250. If the third effort at step 270 is unsuccessful, the AI system 150 can retry until success is achieved. In embodiments, the AI system 150 is limited to a pre-defined number of attempts. If no success is achieved, it notifies the local AI 120A of the failure. The local AI 120A can then notify personnel at location 110A of the failure for manual inspection.

The results of a manual inspection can be manually provided via a computer at location 110A, and can be integrated into the database by the local AI 120A and/or the AI system 150 for future use in subsequent identification attempts.

It will be appreciated that by leveraging the information and processing capabilities of the AI system 150 and other local AI 120, the time required for the process of identifying a seal and other desired information on a truck is greatly reduced from that of the local AI 120A acting alone. In practical terms, the systems and methods of the inventive subject matter allow for a real-time or near-real-time identification of a seal and other relevant information that was not previously possible. This reduces the time a truck 140 is held up before entry into a station 110, reducing the back-up of trucks waiting for admission. Additionally, the time saved helps facilitate a more efficient overall shipping process as trucks are able to get in and out of stations far more efficiently.

Figure 6:
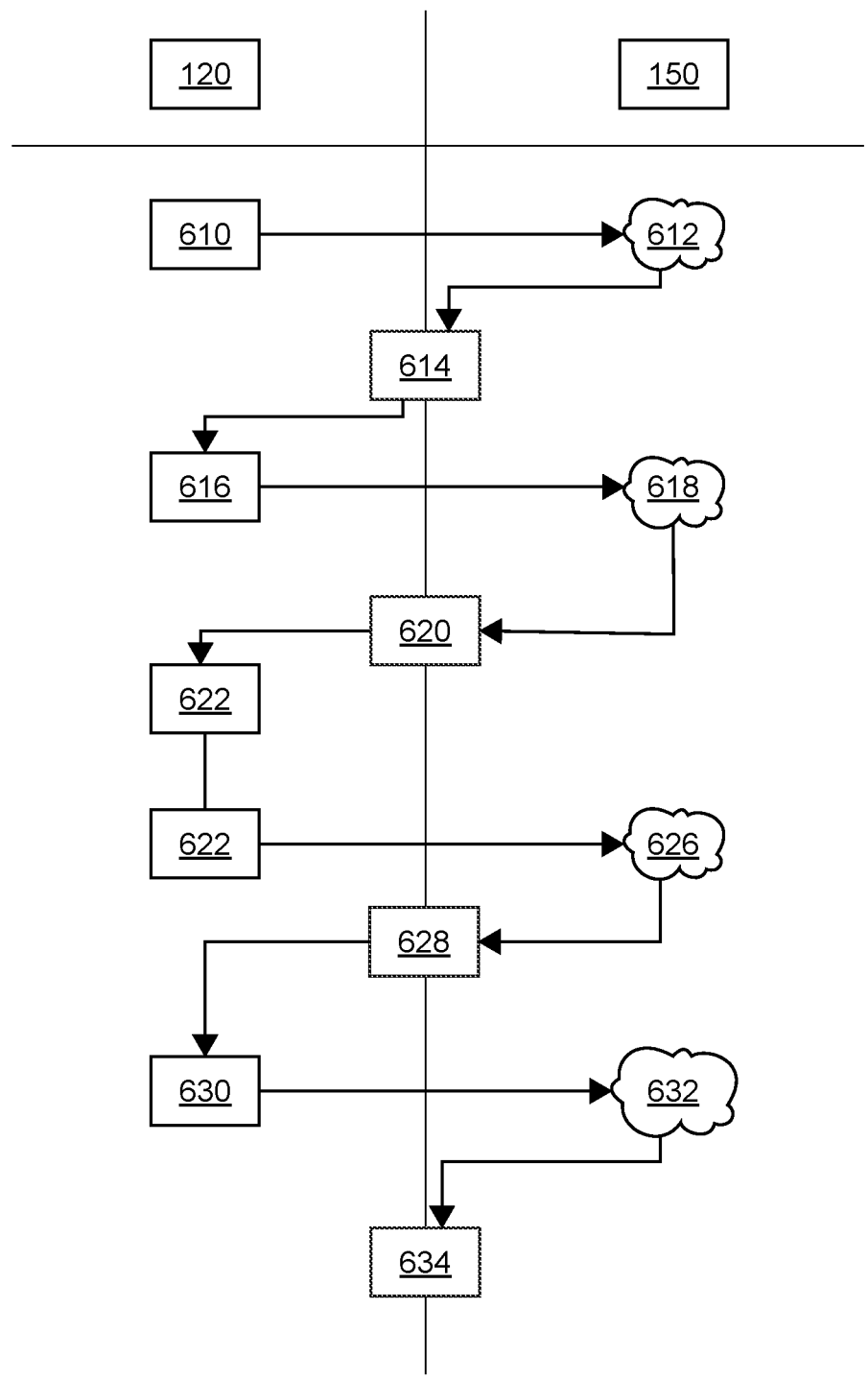
FIG. 6 is a flowchart of another process executed by the system, according to embodiments of the inventive subject matter.

FIG. 6 provides a flowchart of another example process, according to embodiments of the inventive subject matter. This flowchart shows an example of the back-and-forth communication between the local AI 120A and the global AI system 150 that facilitates a rapid identification of a truck and a trailer at a location 110A (for this example, a station located in Toronto, Canada).

At step 610, the local AI 120A detects the truck 140A. Based on the image data from camera 130A, the local AI 120A is able to detect the company name on the truck 140A (the tractor). Thus, for this aspect of interest, the local AI 120A has a 100% confidence that the tractor 140A is from truck company A. The local AI 120A also locates a number that it interprets, based on prior knowledge of where the truck numbers are for this company, as a truck number. However, because of inclement weather conditions, the local AI 120A only has a 90% confidence that the truck number is "S5" and a 10% confidence that the truck number is "55".

At step 612, the local AI 120A consults with the global AI system 150. The AI system 150 has, stored in its database from prior network-wide interactions with trucks from company A, a company rule that all truck numbers for company A start with "S". The AI system 150 then sends this information back to local AI 120A, which revises its confidence to 100% confidence that the truck number is "S5" at step 614. It should be noted that at this step, the AI system 150 could also consult with other local AI 120 of the network for information if it does not have the necessary information.

At step 616, the local AI 120A detects the trailer hauled by truck S5. Based on the image data from camera 130A, the local AI 120A is able to find a trailer number and reads it. By employing image recognition techniques that are known in the art, the local AI 120A determines with a 90% confidence that the trailer number is "G6" and a 10% confidence that it is "66". Again, the local AI 120A consults with the AI system. Suppose that the local AI system 150 does not have a trailer number available (it may be this is the first time this particular trailer arrives at this particular location). It then consults with one or more of the other local AI 120. One of the other local AI 120 reports that the truck with the number "S5" was seen hauling a red trailer with a number "66" at step 618.

This is reported back to the local AI 120A, which proceeds to check the trailer's color of the truck 140A at the station at step 620. At step 622, the local AI 120A confirms that that trailer is red. The confidence level that the trailer is trailer "66" increases, this time to 95%.

However, because of poor weather (and thus, visibility) in Toronto, the local AI 120A cannot find the seal at the back of the trailer at step 624. Thus, at step 626, the local AI 120A consults with the AI system 150. The AI system 150 then in turn consults with the local AI 120 in Miami that provided the prior information (since it is known to the system that the truck was there). The local AI 120 in Miami confirms, based on its own analysis of its own captured image data, with 100% confidence the truck was seen with a seal at the bottom right corner of the trailer. Based on this information, the local AI 120A in Toronto directs the camera 130A to look at the bottom right corner of the trailer and is able to find the seal and read the seal number at step 628. It should be noted that this is how the local AI 120A can "know" where to start looking for trucks of this company in the future, such as in the process described above with regards to FIGS. 3A-3E.

If the seal is intact and readable, the process ends here. However, to continue the example, suppose that the local AI 120A finds that the seal is broken at step 630, which could indicate tampering with the cargo (a possible legal violation). The local AI 120A then consults again with the AI system 150 which turns to the local AI 120 in Miami. The local AI 120 in Miami confirms the seal was present and not tampered with at the stop there at step 632.

At step 634, the local AI 120A receives this information and then informs personnel that the seal was tampered with somewhere between Miami and Toronto. If the seal number was not properly detected by the local AI 120A at step 628, the local AI 120A can also report this. Based on the prior trips by this same truck, the local AI 120A can also report that the seal became unreadable too fast to account for normal wear-and-tear, which also indicates tampering.

In the embodiments discussed above, the local AI 120A is described as communicating with the AI system 150, which then reaches out to other local AI 120 as the need arises. However, in certain situations, the local AI 120A can reach out to other local AI 120 directly when it has been established that a particular local AI 120 has the information needed. In the example above, after discovering that the local AI 120 in Miami last saw the truck, the local AI 120A in Toronto could contact the Miami local AI 120 directly after that for information without having to go through the AI system 150.

It is contemplated that, to improve speed, a local copy of the database housed by AI system 150 could periodically be downloaded by the local AI 120. This can be performed in advance when a particular truck's route is known in advance so that relevant information is already available locally.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of training a networked system to identify an aspect of a target, comprising:
    using a first sensor to derive first sensor data from an environment having the target;
    using a local AI system executed by at least one processor to analyze the first sensor data to make a first effort to identify the aspect of the target;
    determining whether the first effort satisfies a first criterion; and
    in the event that the first effort fails to satisfy the first criterion:
    providing at least some of the first sensor data as an input to a global AI system; and
    using the global AI system executed by at least one second processor to make a second effort to identify the aspect of the target using at least one of the first criterion or a second criterion.

2. The method of claim 1, further comprising: in the event that the second effort satisfies the second criterion, providing information to the local AI system to assist the local AI system in a future identification of the aspect of the target.

3. The method of claim 1, wherein the target is a seal, and the aspect is a sequence of digits displayed on the seal.

4. The method of claim 1, wherein the target comprises a seal affixed to a motor vehicle.

5. The method of claim 4, wherein the motor vehicle is moving while the local AI system is making the first effort to identify the aspect of the target.

6. The method of claim 1, wherein at least one of the first and second criterion comprises a reliability criterion.

7. The method of claim 1, wherein at least one of the first and second criterion comprises an accuracy criterion.

8. The method of claim 1, wherein the environment at least partially obscures the target.

9. The method of claim 3, wherein the local AI system is located at a first location and wherein a vehicle to which the seal is affixed is located at the first location, the method further comprising:
    determining, by the global AI system, that the sequence of digits was unreadable;

consulting, by the global AI system, with a second local AI system, wherein the second local AI system corresponds to a second location from which the vehicle came;

receiving, by the global AI system, a response from the second local AI system that confirms the sequence of digits was successfully read at the second location; and determining, by the global AI system, that the seal was tampered with based on the successful reading of the sequence of digits at the second location and the unsuccessful reading of the sequence of digits at the first location.

\* \* \* \* \*